(12) United States Patent
Sakai et al.

(10) Patent No.: US 7,859,204 B2
(45) Date of Patent: Dec. 28, 2010

(54) CLOSURE PANEL CONTROL APPARATUS

(75) Inventors: Shin Sakai, Kosai (JP); Takahiro Sumiya, Toyohashi (JP)

(73) Assignee: Asmo Co., Ltd., Shizuoka-pref. (JP)

( * ) Notice: Subject to any disclaimer, the term of this patent is extended or adjusted under 35 U.S.C. 154(b) by 403 days.

(21) Appl. No.: 12/153,824

(22) Filed: May 27, 2008

(65) Prior Publication Data

US 2008/0297076 A1  Dec. 4, 2008

(30) Foreign Application Priority Data

May 28, 2007  (JP) ............................. 2007-140540
May 12, 2008  (JP) ............................. 2008-124547

(51) Int. Cl.
*H02P 3/00* (2006.01)

(52) U.S. Cl. .................. 318/286; 318/282; 318/265; 318/280; 318/461; 318/470; 318/467; 700/47; 49/28; 49/26; 49/31; 340/426.27

(58) Field of Classification Search .............. 318/286, 318/461, 280, 282, 265, 470, 467; 340/426.28, 340/426.27; 700/47; 49/28, 26, 31
See application file for complete search history.

(56) References Cited

U.S. PATENT DOCUMENTS

| | | | | |
|---|---|---|---|---|
| 4,870,333 A | * | 9/1989 | Itoh et al. .................... 318/286 |
| 5,351,439 A | * | 10/1994 | Takeda et al. ................... 49/28 |
| 5,521,474 A | * | 5/1996 | Hahn .......................... 318/285 |
| 5,530,329 A | * | 6/1996 | Shigematsu et al. .......... 318/469 |
| 5,994,858 A | * | 11/1999 | Miura .......................... 318/283 |
| 6,150,784 A | * | 11/2000 | Nagaoka ...................... 318/467 |
| 6,531,840 B2 | * | 3/2003 | Sugawara .................... 318/445 |
| 6,906,482 B2 | * | 6/2005 | Shimizu et al. .............. 318/286 |
| 6,946,811 B2 | * | 9/2005 | Kikuta et al. ................ 318/468 |
| 7,170,244 B2 | * | 1/2007 | Choby ......................... 318/280 |
| 7,421,321 B2 | * | 9/2008 | Breed et al. .................... 701/29 |
| 7,690,152 B2 | * | 4/2010 | Kobayashi et al. ............. 49/28 |
| 2007/0084120 A1 | * | 4/2007 | Kobayashi et al. ............. 49/26 |

FOREIGN PATENT DOCUMENTS

| | | |
|---|---|---|
| JP | A-06-123188 | 5/1994 |
| JP | A-10-331524 | 12/1998 |
| JP | A-2006-299568 | 11/2006 |

* cited by examiner

*Primary Examiner*—Rita Leykin
(74) *Attorney, Agent, or Firm*—Posz Law Group, PLC

(57) ABSTRACT

A controller prestores average moving speed data, which corresponds to respective corresponding positions of a window glass of a door driven by a motor at the time of the closing movement of the window glass, as learning data. The controller senses pinching of an object by the window glass based on the learning data and the speed measurement signal obtained at the time of the closing movement of the window glass. The controller senses a disturbance when the speed measurement signal obtained at the time of the closing movement of the window glass exceeds a predetermined value. The controller updates the learning data based on the average moving speed data at the time of the closing movement of the window glass. The controller controls execution and non-execution of updating of the learning data in response to a close state and an open state of the door.

6 Claims, 12 Drawing Sheets

CLOSURE PANEL CONTROL APPARATUS

CROSS REFERENCE TO RELATED APPLICATION

This application is based on and incorporates herein by reference Japanese Patent Application No. 2007-140540 filed on May 28, 2007 and Japanese Patent Application No. 2008-124547 filed on May 12, 2008.

BACKGROUND OF THE INVENTION

1. Field of the Invention

The present invention relates to a closure panel control apparatus, particularly, a closure panel control apparatus.

2. Description of Related Art

In a power window system of a vehicle, which has a pinching limiting function for limiting occurrence of pinching of an object (e.g., a hand or a neck of an occupant) by a window glass (a closure panel), a threshold value is set for measurement data (e.g., a window drive motor rotational speed change), which is measured in conformity with a load applied to the window glass during a closing movement of the window glass. The pinching of the object is detected based on the threshold value. However, an erroneous detection of the rotational speed of the drive motor may be caused by a rotational speed change of the drive motor, which is caused by a change in the slide resistance of the window glass due to, for example, aging and is similar to one that occurs at the time of pinching the object.

In order to resolve the above disadvantage, a technique of updating (learning) the threshold value based on the measurement data has been proposed (see, for example, Japanese Unexamined Patent Publication No. 2006-299568). According to the technique recited in Japanese Unexamined Patent Publication No. 2006-299568, the speed changes in the previous window closing movements are stored (learned), and the pinching is determined based on a difference between the stored learning data and the current speed change. When the threshold value is updated in the above described manner, more reliable detection of the pinching is possible while eliminating the influences of the change in the slide resistance caused by, for example, aging.

However, in the case of the prior art learning method recited in Japanese Unexamined Patent Publication No. 2006-299568, the learning is performed in the same manner in both of an open state and a close state of the door. Thus, in a case of, for example, a sashless door where the slide resistance changes according to an open/close state of the door i.e., according to whether the door is in the open state or in the close state, the speed change to be learned is different between the open state and the close state of the door. As a result, the detection error of the pinching may possibly occur. Specifically, the slide resistance of the window glass in the open state of the door is smaller than the slide resistance of the window glass in the close state of the door. Thus, when the window glass is moved in the close state of the door after the execution of the learning in the open state of the door, the measured value may possibly increase beyond the threshold value, which is stored in the open state of the door, to make an erroneous detection of the pinching.

Particularly, as shown in FIG. 13, in the case of the sashless door, the change (decrease) in the rotational speed of the motor at a weather strip of the door in the close state of the door is relatively large, so that the rotational speed of the motor in the open state of the door and the rotational speed of the motor in the close state of the door are substantially different at the weather strip. As a result, in the case of the prior art learning method of executing the same learning in both of the open state and close state of the door, there is a high possibility of making the erroneous detection of the pinching at the weather strip.

In view of the above disadvantage, a new technique (see, for example, Japanese Patent No. 3484923 that was previously published as Japanese Unexamined Patent Publication No. H10-331524) has been proposed to use a weighting amount for the threshold value renewed in the open state of the door and a weighting amount for the threshold value renewed in the close state of the door. The corresponding one of these weighting amounts is added to the value of the motor current (serving as the threshold value) to provide the new threshold value.

However, in the power window control apparatus of Japanese Patent No. 3484923, although the two different weighting amounts are used in the open state of the door and the close state of the door, respectively, the erroneous detection of the pinching, which is caused by a disturbance (e.g., vibrations caused by bumps on a road surface, such as bumps of a manhole cover, or vibrations caused by opening and closing of the door, is not taken into account.

SUMMARY OF THE INVENTION

The present invention addresses one or more of the above disadvantages. Thus, it is an objective of the present invention to provide a closure panel control apparatus, which can reduce occurrence of erroneous detection of pinching by appropriately updating learning data even in a case where a slide resistance of the closure panel differs between an open state of a door and a close state of the door and/or which can limit erroneous detection of pinching caused by a disturbance.

To achieve the objective of the invention, there is provided a closure panel control apparatus for a vehicle, including a drive means, a moving speed sensing means, a moving speed storage means, a pinching sensing means, a disturbance sensing means and a moving speed updating means. The drive means is for driving a closure panel, which is provided at a door of the vehicle, to open and close the closure panel. The moving speed sensing means is for outputting a speed measurement signal in response to an opening movement and a closing movement of the closure panel. The moving speed storage means is for prestoring average moving speed data, which corresponds to respective corresponding positions of the closure panel at the time of the closing movement of the closure panel, as learning data. The pinching sensing means is for sensing pinching of an object by the closure panel based on: the learning data; and the speed measurement signal, which is received from the moving speed sensing means at the time of the closing movement of the closure panel. The disturbance sensing means is for sensing a disturbance when the speed measurement signal, which is obtained at the time of the closing movement of the closure panel, exceeds a predetermined value. The moving speed updating means is for updating the learning data based on the average moving speed data computed based on the speed measurement signal obtained at the time of the closing movement of the closure panel. The moving speed updating means controls execution and non-execution of updating of the learning data in response to a close state and an open state of the door. The moving speed updating means computes the learning data through use of different update coefficients that are specified for the open state and the close state, respectively, of the door. The moving speed updating means computes and updates the learning data through use of a disturbance update value, which is corrected to fall within a predetermined range, when the disturbance is sensed with the disturbance sensing means.

To achieve the objective of the present invention, there is also provided a closure panel control apparatus for a vehicle, including a drive means, a moving speed sensing means, a moving speed storage means, a pinching sensing means and a moving speed updating means. The drive means is for driving a closure panel, which is provided at a door of the vehicle, to open and close the closure panel. The moving speed sensing means is for outputting a speed measurement signal in response to an opening movement and a closing movement of the closure panel. The moving speed storage means is for prestoring average moving speed data, which corresponds to respective corresponding positions of the closure panel at the time of the closing movement of the closure panel, as learning data. The pinching sensing means is for sensing pinching of an object by the closure panel based on: the learning data; and the speed measurement signal, which is received from the moving speed sensing means at the time of the closing movement of the closure panel. The moving speed updating means is for updating the learning data based on the average moving speed data computed based on the speed measurement signal obtained at the time of the closing movement of the closure panel. The moving speed updating means controls execution and non-execution of updating of the learning data in response to a close state and an open state of the door. The moving speed updating means does not execute the updating of the learning data when the door is in the open state.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

An embodiment of the present invention will be described with reference to the accompanying drawings. Structures and procedures described below are not intended to limit the scope of the present invention and may be modified without departing from the spirit and scope of the present invention.

Figure 1:
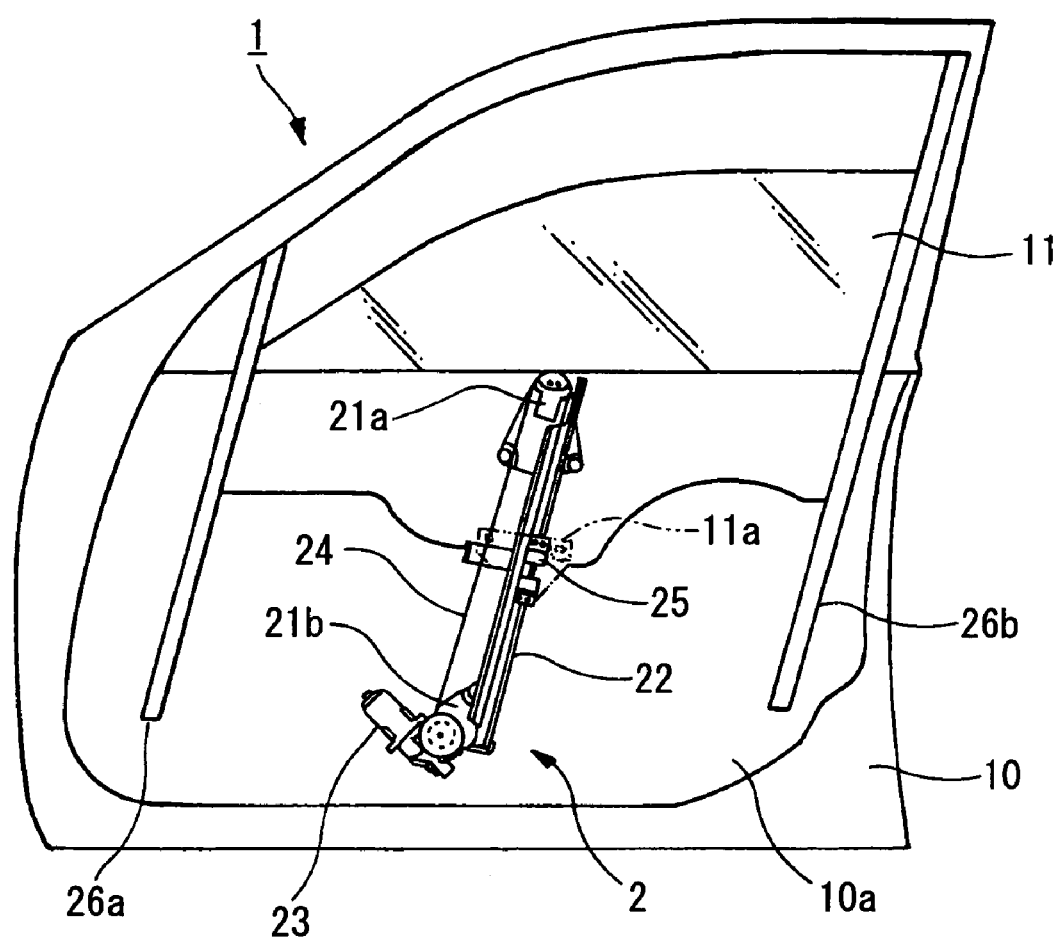
FIG. 1 is a schematic view of a power window system according to an embodiment of the present invention.
Figure 2:
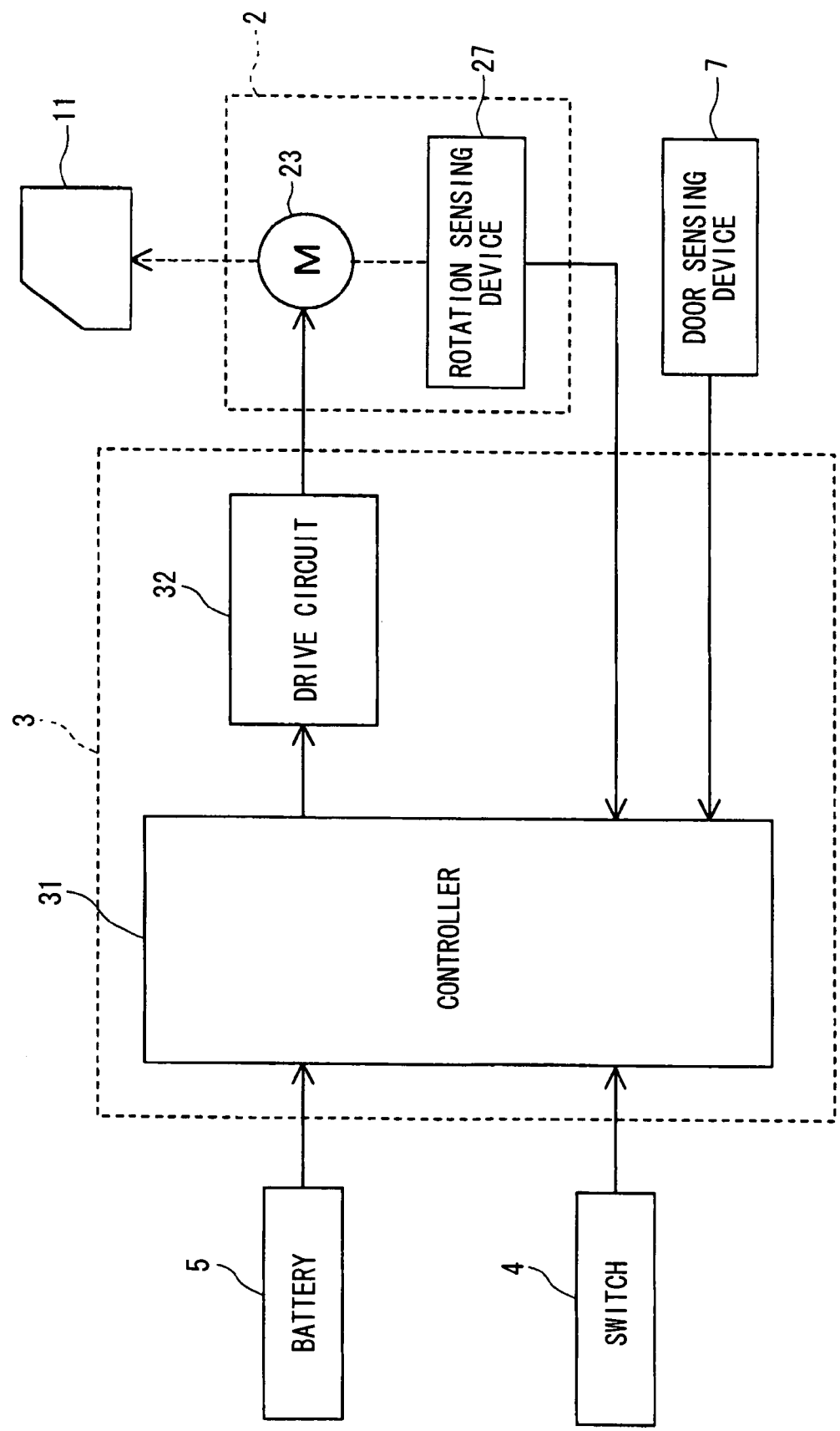
FIG. 2 is a diagram showing an electrical structure of the power window system shown in FIG. 1.

A control apparatus (closure panel control apparatus) of a power window system according to the embodiment of the present invention will be described. FIG. 1 is a schematic view of the power window system of the present embodiment, and FIG. 2 is a diagram showing an electrical structure of the power window system 1. In the power window system 1 of the present embodiment, an electric motor 23 is rotated to drive a window glass 11 to open and close (i.e., to lower and raise) the window glass 11. The window glass 11 serves as a closure panel (an opening and closing body) provided in a door 10 of the vehicle. The power window system 1 includes a drive arrangement (a drive means) 2, a control arrangement (a control means) 3, a manipulation switch 4 and a door open/close sensing device 7. The drive arrangement 2 drives the window glass 11 to lower or raise the window glass 11, i.e., to execute the opening/closing movement of the window glass 11. The control arrangement 3 controls the operation of the drive arrangement 2. The manipulation switch 4 is operated by an occupant of the vehicle to command the corresponding operation. The door open/close sensing device 7 senses the open/close state of the door of the vehicle.

The drive arrangement 2 of the present embodiment includes upper and lower brackets 21a, 21b, a guide rail 22, the motor 23, an endless tape 24, a slider 25 and two guide frames 26a, 26b. The upper and lower brackets 21a, 21b are installed to an inner panel 10a of the door 10. The guider rail 22 is installed to connect between the upper and lower brackets 21a, 21b. The motor 23 is installed to the lower bracket 21b. The tape 24 is placed around the upper bracket 21a and a sprocket connected to an output shaft of the motor 23. The slider 25 is installed to the tape 24 and is slidably guided by the guide rail 22. The guide frames 26a, 26b guide the window glass 11 in an opening/closing direction. A carrier plate 11a, which supports a lower end portion of the window glass 11, is installed to the slider 25.

The motor 23 is rotatable in both of a normal direction and a reverse direction upon receiving an electric power from the control arrangement 3. In the drive arrangement 2 of the present embodiment, when the motor 23 is rotated in the normal direction or reverse direction, the rotational force of the motor 23 is transmitted to the tape 24 through the sprocket. Thereby, the tape 24 is turned by the rotational force to guide the slider 25 along the guide rail 22 in the vertical direction. When the slider 25 is guided in the vertical direction along the guide rail 22, the slider 25 moves the window glass 11 in the vertical direction through the carrier plate 11a along the guide frames 26a, 26b. The drive arrangement 2 drives the motor 23 to execute the opening/closing movement of the window glass 11.

A rotation sensing device 27, which serves as a moving speed sensing means, is provided integrally with the motor 23 of the present embodiment. The rotation sensing device 27 outputs pulse signals (a speed measurement signal and a rotational speed signal), which are synchronized with the rotation of the motor 23, to the control arrangement 3. The rotation sensing device 27 includes a plurality of Hall elements to sense a magnetic change of a magnet, which is rotated integrally with the output shaft of the motor 23. With the above construction, the rotation sensing device 27 outputs the pulse signals, which are synchronized with the rotation of the motor 23. That is, the pulse signal is outputted every predetermined moving distance of the window glass 11 or every predetermined rotational angle of the motor 23. In this way, the rotation sensing device 27 can output the signal that corresponds to the moving speed of the window glass 11, which is generally proportional to the rotational speed of the motor 23.

In the present embodiment, the Hall elements are used in the rotation sensing device 27. However, the present invention is not limited to this construction. Specifically, in place of the Hall elements, an encoder may be used in the rotation sensing device 27 as long as the rotation sensing device 27 can measure the rotational speed of the motor 23. Furthermore, in the present embodiment, the rotation sensing device 27 is provided integrally with the motor 23 to measure the rotational speed of the output shaft of the motor 23, which corresponds to the movement of the window glass 11. However, the present invention is not limited to this construction. For instance, any known means or device may be used to directly measure the moving speed of the window glass 11.

The control arrangement 3 of the present embodiment includes a controller 31 and a drive circuit 32. A necessary electric power is supplied from a battery 5 of the vehicle to the controller 31 and the drive circuit 32.

The controller 31 of the present embodiment includes a microcomputer, which has a CPU, memories (e.g., a ROM, a RAM), an input circuit and an output circuit. The CPU, the memories, the input circuit and the output circuit are interconnected through a bus line. The structure of the controller 31 is not limited to the above described one. For example, a DSP or a gate array may be used to construct the controller 31.

The controller 31 drives the motor 23 in the normal direction or the reverse direction through the drive circuit 32 based on a manipulation signal outputted from the manipulation switch 4 to execute the opening/closing movement of the window glass 11. Furthermore, the controller 31 can sense pinching of an object between an upper end portion of the window glass 11 and a window frame based on pulse signals, which are received from the rotation sensing device 27. When the pinching of the object is sensed, the controller 31 drives the motor 23 in the opening direction through the drive circuit 32 to open, i.e., to lower the window glass 11. As described above, the controller 31 of the present embodiment functions as a pinching sensing means.

The drive circuit 32 of the present embodiment includes FET's and changes a polarity of the electric power supplied to the motor 23 based on the input single from the controller 31. Specifically, when the drive circuit 32 receives a normal rotation command signal from the controller 31, the drive circuit 32 supplies the electric power to the motor 23 to rotate the motor 23 in the normal direction. In contrast, when the drive circuit 32 receives a reverse rotation command signal from the controller 31, the drive circuit 32 supplies the electric power to the motor 23 to rotate the motor 23 in the reverse direction. Alternatively, the drive circuit 32 may be constructed to change the polarity using a relay circuit. Furthermore, the drive circuit 32 may be integrated in the controller 31.

The controller 31 senses leading edges and trailing edges (pulse edges) of the received pulse signals. The controller 31 computes the rotational speed (rotational period) of the motor 23 based on intervals (periods) of the pulse edges and senses the rotational direction of the motor 23 based on a phase difference of each pulse signal. That is, the controller 31 indirectly computes the moving speed of the window glass 11 based on the rotational speed (rotational period) of the motor 23 and determines the moving direction of the window glass 11 based on the rotational direction of the motor 23. Furthermore, the controller 31 counts the pulse edges. This pulse count value is incremented or decremented in response to the opening/closing movement of the window glass 11. The controller 31 determines an opening/closing position (a vertical slide position) of the window glass 11 based on the degree of the pulse count value.

The controller 31, which serves as a moving speed storage means, prestores rotational speed data (rotational speed differences $\Delta\omega$) of the motor 23, which represents the moving speed of the window glass 11, as learning data in the memory. The controller 31, which now serves as a moving speed updating means, essentially updates the learning data every time the closing movement of the window glass 11 is performed.

In the present embodiment, except the case where the pinching is detected, the learning data is updated even at the time of applying an influential external force, which may possibly affect the rotational speed data, to the window glass 11, such as at the time of traveling at a high speed, the time of opening/closing the door, the time of freezing and/or the time of traveling along a rough road while reflecting such a state (disturbance). The controller 31, which serves as a disturbance sensing means, determines occurrence of the disturbance when the rotational speed data (rotational speed difference), which is computed based on the inputted pulse signals, exceeds a predetermined range.

In the present embodiment, the learning data is updated even in the case where the influential external force is applied, so that there is an increased chance of learning. In this way, it is always possible to maintain the learning data, which is adapted to the practical situation. Thereby, it is possible to reduce occurrence of an erroneous detection of the pinching. In the case of updating the learning data only in the state where the influential external force is not applied like the prior art, it is required to determine whether the influential external force is applied to the window glass 11 based on a sensor input. However, according to the present embodiment, even in the state where the influential external force is applied, the learning data is updated to avoid the occurrence of the erroneous detection of the pinching at the time of closing movement of the window glass 11. Thus, it is not required to implement the above determination process. In this way, it is possible to simplify the entire structure, and it is possible to limit the cost increase.

The manipulation switch 4 of the present embodiment is a rocker switch, which is operable in two steps and includes an opening switch, a closing switch and an automatic switch. When the occupant operates the manipulation switch 4, a command signal for executing the opening/closing movement of the window glass 11 is outputted from the manipulation switch 4 to the controller 31.

More specifically, when the manipulation switch 4 is manipulated in one step toward one end side thereof, the opening switch is turned on. Thus, a normal opening command signal for executing a normal opening movement of the window glass 11 (for executing an opening movement of the window glass 11 only through a period of manipulating the manipulation switch 4) is outputted from the manipulation switch 4 to the controller 31. Furthermore, when the manipulation switch 4 is manipulated in one step toward the other end side thereof, the closing switch is turned on. Thus, a normal closing command signal for executing a normal closing movement of the window glass 11 (for executing a closing movement of the window glass 11 only through a period of manipulating the manipulation switch 4) is outputted from the manipulation switch 4 to the controller 31.

Furthermore, when the manipulation switch 4 is manipulated in two steps toward the one end side thereof, the opening switch and the automatic switch are both turned on. Thus, an automatic opening command signal for executing an automatic opening movement of the window glass 11 (for executing an opening movement of the window glass 11 all the way to a full open position regardless of whether the manipulation of the manipulation switch 4 is stopped) is outputted from the manipulation switch 4 to the controller 31. Also, when the manipulation switch 4 is manipulated in two steps toward the other end side thereof, the closing switch and the automatic switch are both turned on. Thus, an automatic closing command signal for executing an automatic closing movement of the window glass 11 (for executing a closing movement of the window glass 11 all the way to a full close position regardless of whether the manipulation of the manipulation switch 4 is stopped) is outputted from the manipulation switch 4 to the controller 31.

The controller 31 drives the motor 23 through the drive circuit 32 throughout the period of receiving the normal opening command signal from the manipulation switch 4 (throughout the period of manipulating the manipulation switch 4) to execute the normal opening movement of the window glass 11. Also, the controller 31 drives the motor 23 through the drive circuit 32 throughout the period of receiving the normal closing command signal from the manipulation switch 4 (throughout the period of manipulating the manipulation switch 4) to execute the normal closing movement of the window glass 11.

Furthermore, when the controller 31 receives the automatic opening command signal from the manipulation switch 4, the controller 31 drives the motor 23 through the drive circuit 32 to execute the automatic opening movement of the window glass 11 all the way to the full open position. Also, when the controller 31 receives the automatic closing command signal from the manipulation switch 4, the controller 31 drives the motor 23 through the drive circuit 32 to execute the automatic closing movement of the window glass 11 all the way to the full close position.

The controller 31 monitors occurrence of the pinching of the object by the window glass 11 when the closing movement of the window glass 11 (normal closing movement and automatic closing movement) is executed. Specifically, when the pinching occurs, the moving speed of the window glass 11 and the rotational speed of the motor 23 are reduced (lengthening of the rotational period). Thus, the controller 31 of the present embodiment always monitors the change in the rotational speed of the motor 23.

The controller 31 first senses start of the pinching based on the change in the rotational speed. Then, when the controller 31 senses a predetermined amount of change in the rotational speed since the time of detecting the start of the pinching, the controller 31 determines, i.e., confirms that the pinching has occurred.

Then, when the pinching is confirmed, the controller 31 drive the motor 23 in the reverse direction to release the pinched object from the window glass 11, so that the window glass 11 is opened by a predetermined amount. Alternatively, when the occurrence of the pinching is confirmed, the controller 31 may only stop the further closing movement of the window glass 11 by stopping the motor 23 to enable releasing of the pinched object from the window glass 11.

The door open/close sensing device 7 senses the open/close state of the door of the vehicle and includes a door switch of a contact type or a contactless type. The door open/close sensing device 7 outputs an open/close signal in response to the open/close state of the door, and the controller 31 determines the open/close state of the door, i.e., whether the door is in the open state or the close state based on this signal.

Next, a learning data updating operation of the power window system 1 of the present embodiment will be described with reference to FIGS. 3 to 5B.

In the present embodiment, when the power window system 1 is operated to execute the closing movement of the window glass 11, the rotational speed $\omega 0$ of the motor 23 is computed based on the pulse signal received from the rotation sensing device 27. A rotational speed difference $\Delta\omega 0$ is computed based on the rotational speed $\omega 0$ every time the pulse edge is sensed. The values of the rotational speed differences $\Delta\omega 0$ form a data column, in which the values are stored in relation to the pulse count values, respectively.

The controller 31 stores the learning data (rotational speed differences) $\Delta\omega$. The values of the learning data $\Delta\omega$ also form a data column, in which the values are stored in relation to the pulse count values, respectively. In this way, the characteristics of the learning data $\Delta\omega$ can be stored for every predetermined moving interval of the window glass 11. Thereby, the detection of the pinching can be made for each of the positions. The learning data $\Delta\omega$ is updated by using the rotational speed difference $\Delta\omega 0$ for each closing movement of the window glass 11. The learning data before the updating will be referred to as pre-update learning data $\Delta\omega 0$ before, and the learning data after the updating will be referred to as post-update learning data $\Delta\omega 0$ after.

In the present embodiment, when the rotational speed difference $\Delta\omega 0$ is computed upon the execution of the closing movement without encountering the pinching of the object by the window glass 11, difference data d between the rotational speed difference $\Delta\omega 0$ and the current pre-update learning data $\Delta\omega 0$ before is computed through the following equation (1) in relation to the respective moving positions (i.e., in relation to the respective pulse count values).

$$d = \Delta\omega 0 - \Delta\omega \text{before} \qquad \text{Equation (1)}$$

Figure 3:
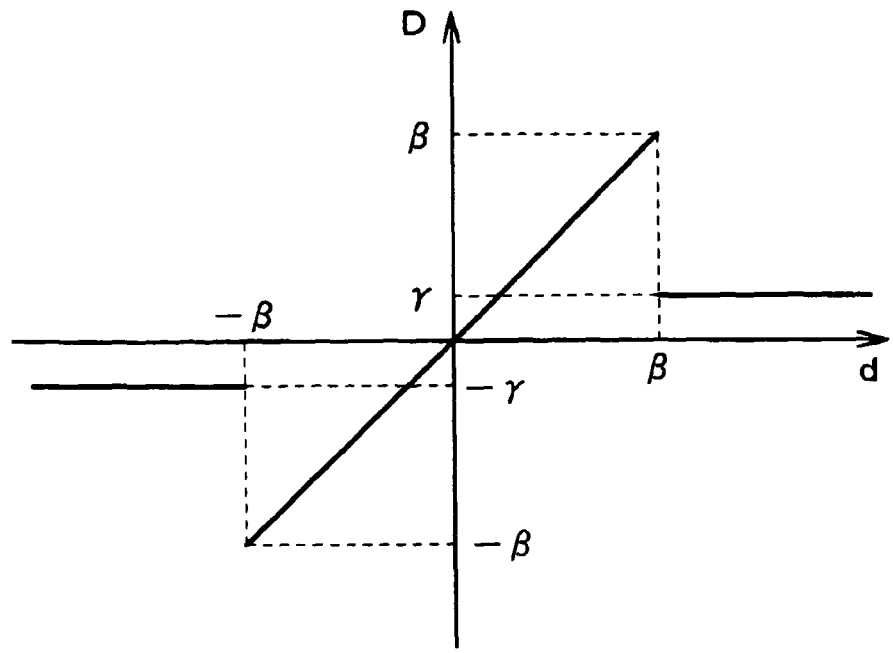
FIG. 3 is a diagram showing a method for converting difference data to corrective difference data.

In the present embodiment, as shown in FIG. 3, when the difference data d is in a range from a predetermined disturbance learning data determination threshold value $-\beta$ to a predetermined disturbance learning data determination threshold value $\beta$, i.e., in a normal learning data update range $(-\beta \leq d \leq \beta)$, the difference data d is set as corrective difference data D. Here, the predetermined disturbance learning data determination threshold value $-\beta$ is a negative constant, and the predetermined disturbance learning data determination threshold value $\beta$ is a positive constant.

In contrast, when the difference data d is less than the disturbance learning data determination threshold value $-\beta$, i.e., in a disturbance learning data range $(d<-\beta)$, a disturbance learning data update amount $-\gamma$, which serves as a disturbance update value, is set as the corrective difference data D. The disturbance learning data update amount $-\gamma$ is a negative constant. In contrast, when the difference data d is more than the disturbance learning data determination threshold value $\beta$, i.e., in a disturbance learning data range $(\beta<d)$, a disturbance learning data update amount $\gamma$, which serves as a disturbance update value, is set as the corrective difference data D. The disturbance learning data update amount $\gamma$ is a positive constant. Here, the value of $\gamma$ is set to be smaller than the value of $\beta$.

In the present embodiment, the post-update learning data $\Delta\omega$after is computed through the following equation (2) by adding correction data, i.e., a product of the corrective difference data D and a learning update coefficient $\alpha$ (a predetermined corrective coefficient) to the pre-update learning data $\Delta\omega$before. The learning update coefficient $\alpha$ is a constant, which is larger than 0 (zero) but smaller than 1 (i.e., $0<\alpha<1$). The correction data ($\alpha \cdot D$) is a value that falls in a predetermined range (i.e., $-\alpha \cdot \beta \leq \alpha \cdot D \leq \alpha \cdot \beta$).

$$\Delta\omega\text{after}=\Delta\omega\text{before}+\alpha \times D \qquad \text{Equation (2)}$$

Furthermore, in the present embodiment, the learning update coefficient $\alpha$ is changed according to the open/close state of the door. Specifically, when the door is closed, a door close time learning update coefficient $\alpha 1$ is used as the learning update coefficient $\alpha$. The door close time learning update coefficient $\alpha 1$ is a constant, which is larger than 0 (zero) but smaller than 1 (i.e., $0<\alpha 1<1$). In contrast, when the door is open, a door open time learning update coefficient $\alpha 2$ is used as the learning update coefficient. The door open time learning update coefficient $\alpha 2$ is a constant, which is larger than 0 (zero) but smaller than 1 (i.e., $0<\alpha 2<1$). Furthermore, the door close time learning update coefficient $\alpha 1$ is smaller than the door open time learning update coefficient $\alpha 2$. The door close time learning update coefficient $\alpha 1$ and the door open time learning update coefficient $\alpha 2$ are the predetermined constants, which make the post-update learning data $\Delta\omega$after in the door close state and the post-update learning data $\Delta\omega$after in the door open state to be generally the same value and which are prestored in the memory.

As discussed above, according to the present embodiment, in the case where the difference data d does not exceed the disturbance learning data determination threshold value ($-\beta$, $\beta$), i.e., in the case where the difference data d is in the normal learning data update range, the current condition (e.g., the current slide resistance) is reflected into the post-update learning data $\Delta\omega$after by adding the product of the difference data d and the learning update coefficient $\alpha$ to the pre-update learning data $\Delta\omega$before. In this way, the post-update learning data $\Delta\omega$after is updated by the update value, which is proportional to the difference data d.

Furthermore, in the case where the difference data d exceeds the disturbance learning data determination threshold value ($-\beta$, $\beta$), i.e., in the case where the difference data d is in the disturbance learning data range, it is determined that the disturbance has occurred. Therefore, in order to limit the influence of the disturbance on the post-update learning data $\Delta\omega$after, the predetermined constant ($\alpha \cdot \gamma$, $-\alpha \cdot \gamma$) is added to the pre-update learning data $\alpha\omega$before to obtain the post-update learning data $\Delta\omega$after.

Furthermore, in the case of the sashless door, the slide resistance in the door open state is extremely small in comparison to the slide resistance in the door close state. In view of this, the post-update learning data $\Delta\omega$after is adjusted to generally the same value in both the door close state and the door open state by using the two different coefficients, i.e., the door close time learning update coefficient $\alpha 1$ and the door open time learning update coefficient $\alpha 2$ (here, $\alpha 1<\alpha 2$), respectively, as the learning update coefficient $\alpha$ that is used to correct the corrective difference data D.

Figure 4A:
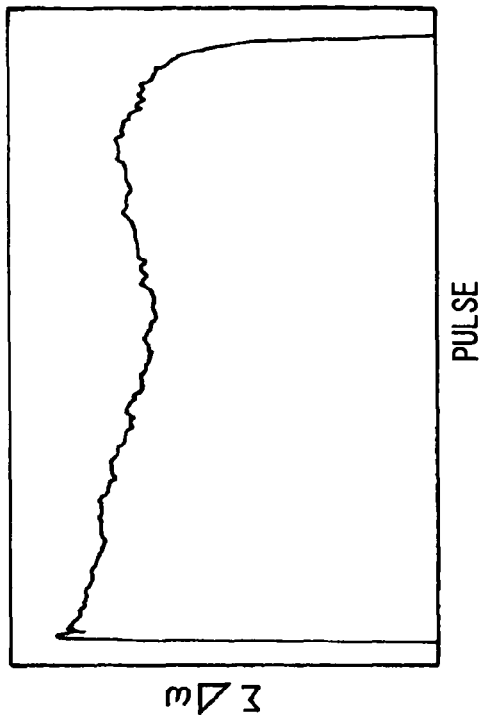
FIG. 4A is a diagram showing a relationship between a cumulative value of rotational speed differences and a pulse count number during execution of a closing movement of a window glass in absence of a disturbance at a normal state.

FIG. 4A shows a change in a cumulative value $\Sigma\Delta\omega 0$ (corresponding to the rotational speed $\omega 0$) of the rotational speed differences $\Delta\omega 0$ of the motor 23 at the time of executing the closing movement of the window glass 11 from the full open position to the full close position in the normal state where the pinching of the object by the window glass 11 has not occurred, and the disturbance caused by, for example, door closing movement or freezing has not been applied. The axis of abscissas indicates a pulse count number. As indicated in FIG. 4A, due to the application of the slide resistance to the window glass 11, the cumulative value $\Sigma\Delta\omega 0$ of the rotational speed differences $\Delta\omega 0$ includes slide related minute changes.

Figure 4B:
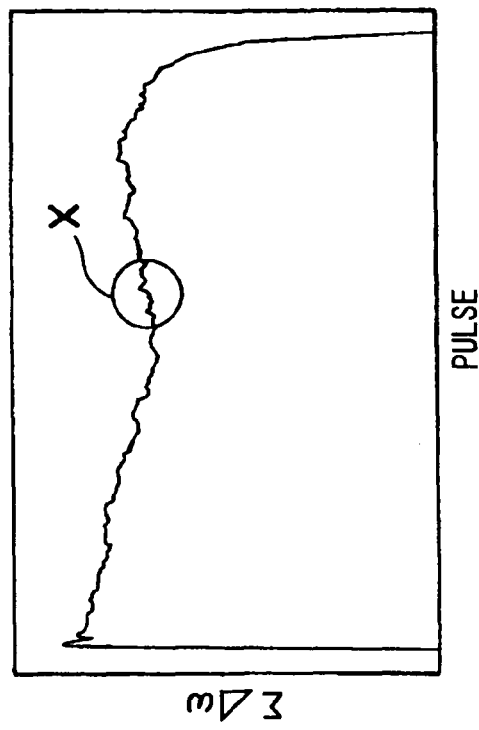
FIG. 4B is a diagram showing a relationship between a cumulative value of learning data and a pulse count number during the execution of the closing movement of the window glass at the normal state.

FIG. 4B indicates a change in the cumulative value $\Sigma\Delta\omega$ (corresponding to the rotational speed) of the learning data $\Delta\omega$, which is updated based on the closing movement shown in FIG. 4A.

In general, the slide resistance change, which is caused by aging, gradually affects the rotational speed $\omega 0$, so that the amount of change in the rotational speed $\omega 0$ at each closing movement is relatively small. In the normal state of FIG. 4A where the disturbance is not applied, the change in the cumulative value $\Sigma\Delta\omega 0$ of the rotational speed differences $\Delta\omega 0$ is generally the same as a change in a cumulative value $\Sigma\Delta\omega$ of the pre-update learning data $\Delta\omega$before. The post-update learning data $\Delta\omega$after, which is updated in view of the rotational speed difference $\Delta\omega 0$ obtained at this time, shows generally the same change as that of the pre-update learning data $\Delta\omega$before.

Figure 4C:
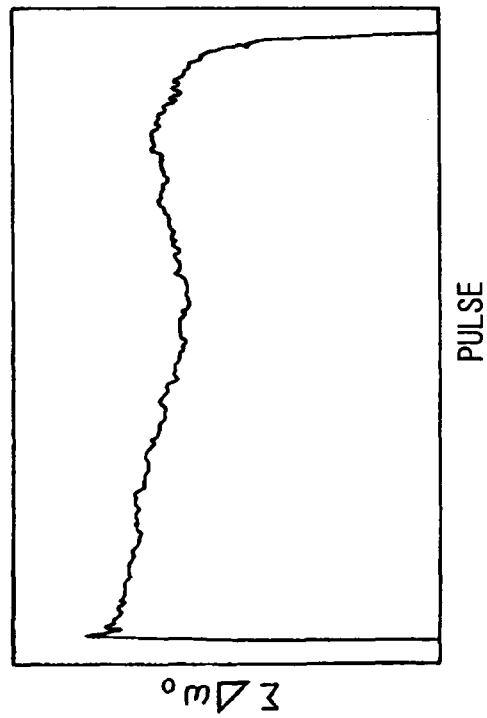
FIG. 4C is a diagram showing a relationship between a cumulative value of rotational speed differences and a pulse count number at the time of closing a door strongly and abruptly to apply a disturbance during the closing movement of the window glass.

FIG. 4C shows a change in the cumulative value $\Sigma\Delta\omega 0$ of the rotational speed differences $\Delta\omega 0$ in a case of strongly and abruptly closing the door during the execution of the closing movement of the window glass 11. In FIG. 4C, it is understood that a pulsed change, which is caused by the strong and abrupt closing of the door, is overlapped on the cumulative value $\Sigma\Delta\omega 0$ of the rotational speed differences $\Delta\omega 0$.

In generally, the abrupt change in the environment (e.g., the strong and abrupt closing of the door) has the significant influence on the rotational speed difference $\Delta\omega 0$. However, such an influence does not last long. Therefore, at the next time when the closing movement of the window glass 11 is executed, the change in the cumulative value $\Sigma\Delta\omega 0$ of the rotational speed differences $\Delta\omega 0$ shown in FIG. 4A should be obtained.

In the present embodiment, even when the above disturbance is applied, the learning data $\Delta\omega$ is updated in view of such a disturbance. Specifically, even when the disturbance occurs, the disturbance does not occur at the next time or the time after the next time. Therefore, even in the case where the learning data is updated in view of the change at the time of occurrence of the disturbance to cause a slight deviation in the learning data, such a deviation is corrected at the next time or time after the next time. Moreover, when the number of times of updating is increased, the learning data is corrected in conformity with the reality.

Figure 4D:
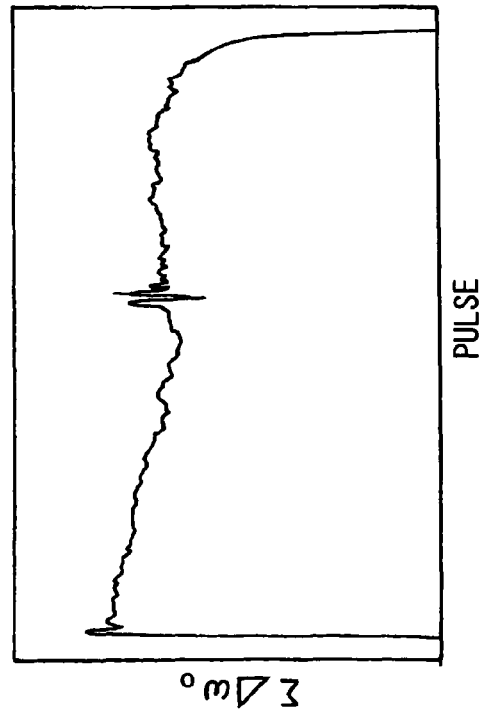
FIG. 4D is a diagram showing a relationship between a cumulative value of learning data and a pulse count number at the time of closing the door strongly and abruptly during the closing movement of the window glass.

FIG. 4D shows a change in the cumulative value $\Sigma\Delta\omega$ of the learning data $\Delta\omega$, which is updated at the time of executing the closing movement shown in FIG. 4C. A circled area X shown in FIG. 4D indicates that a small influence is applied due to the application of the pulsed disturbance but is not conspicuous in comparison to the other area. As described above, according to the present embodiment, even when the large disturbance is applied, the change in the learning data $\Delta\omega$ does not substantially deviate from that of the ideal learning data. Thus, even when the learning data $\Delta\omega$ is updated in view of the above disturbance, the erroneous detection of the pinching is less likely to occur, and the number of times of learning can be increased. Therefore, it is possible to maintain the learning data $\Delta\omega$ in conformity with the reality.

Figure 5A:
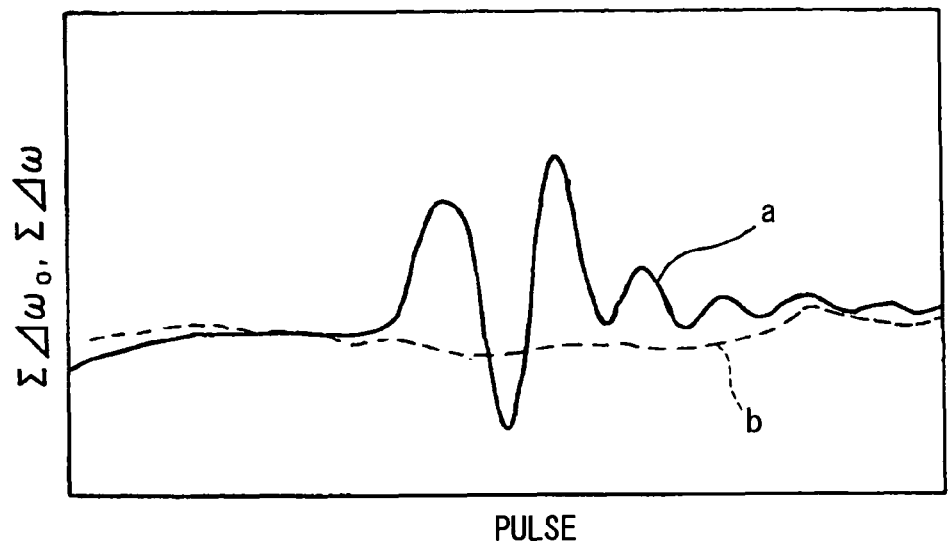
FIG. 5A is a diagram showing a change in a cumulative value of rotational speed differences and a change in a cumulative value of learning data at the time of applying the disturbance shown in FIG. 4C.

In FIG. 5A, a solid line "a" indicates the cumulative value $\Sigma\Delta\omega 0$ of the rotational speed differences $\Delta\omega 0$ at the time of applying the disturbance shown in FIG. 4C, and a dotted line "b" indicates the cumulative value $\Sigma\Delta\omega$ of the learning data $\Delta\omega$ ($\Delta\omega$before) at that time. As indicated in FIG. 5A, when the disturbance is applied, the cumulative value $\Sigma\Delta\omega 0$ of the rotational speed differences $\Delta\omega 0$ is largely deviated from that of the learning data $\Delta\omega$.

Figure 5B:
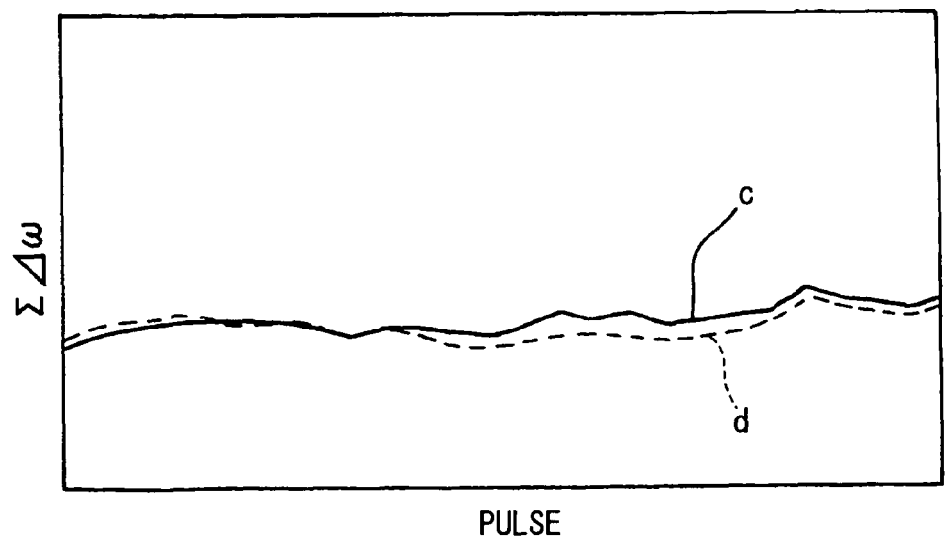
FIG. 5B is a diagram showing the change in the cumulative value of the learning data before the application of the disturbance and a change in the cumulative value of the learning data after the application of the disturbance.

In FIG. 5B, the dotted line "b" indicates the cumulative value $\Sigma\Delta\omega$ of the learning data $\Delta\omega$ ($\Delta\omega$before) before the application of the disturbance shown in FIG. 4C, and a solid line "c" indicates the cumulative value $\Sigma\Delta\omega$ of the learning data $\Delta\omega$ ($\Delta\omega$after) after the application of the disturbance. As shown in FIG. 5B, the learning data $\Delta\omega$after is updated in view of the disturbance and is thereby is only slightly deviated from the learning data $\Delta\omega$before. However, as is understood from FIG. 5B, the disturbance does not have the significant influence on the post-update data, so that the post-update data is not significantly deviated from the pre-update data in comparison to the other area where the disturbance is not applied.

Figure 6:
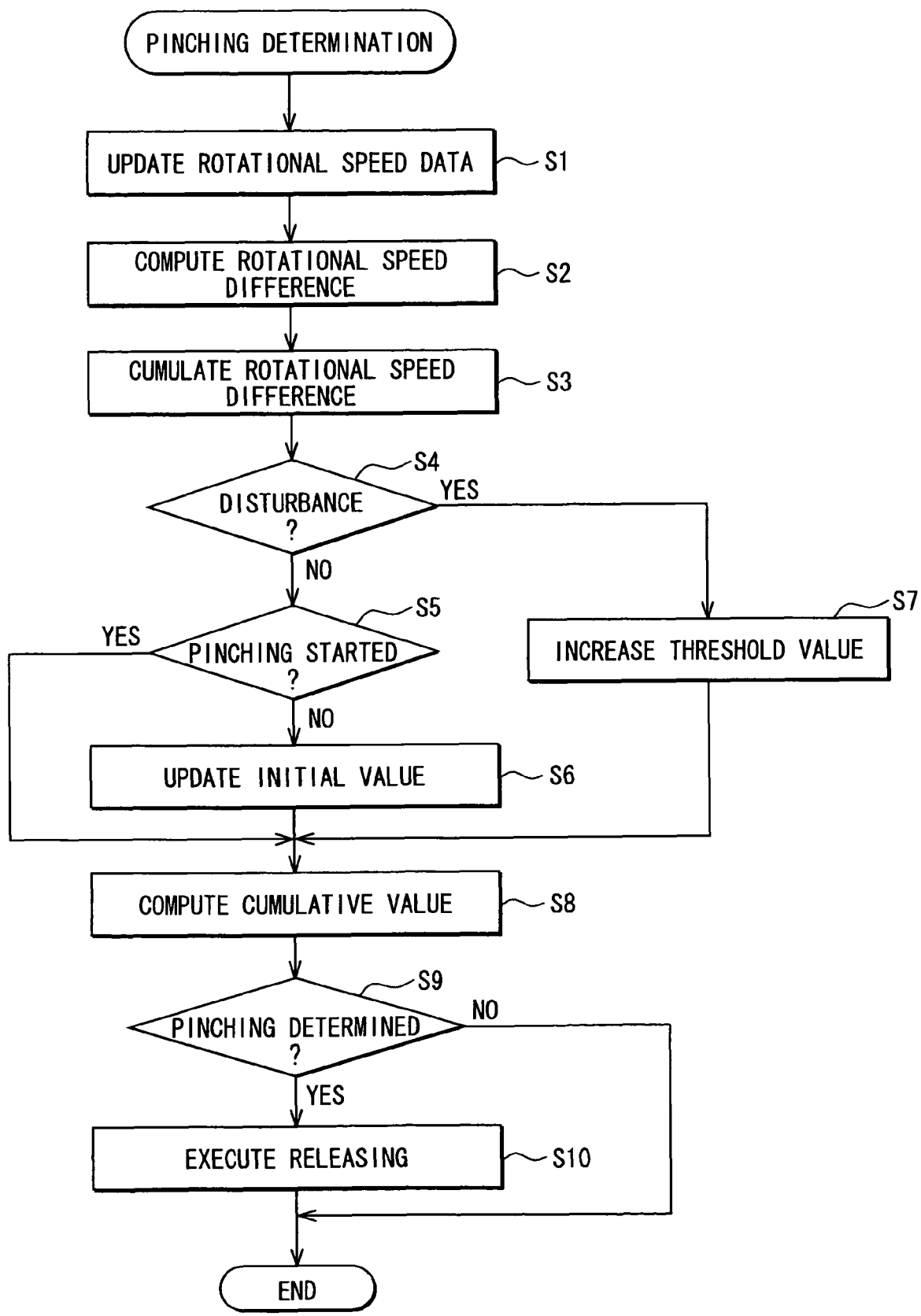
FIG. 6 is a diagram showing a flowchart of a pinching determination operation.

Next, a pinching determination operation of the controller 31 of the present embodiment will be described with reference to the flowchart shown in FIG. 6.

First, at step S1, the controller 31 updates the rotational speed data of the motor 23 based on the pulse signal received from the rotation sensing device 27. Specifically, the controller 31 senses the pulse edge through signal processing of the pulse single received from the rotation sensing device 27. Then, every time the pulse edge is sensed, the controller 31 increments the pulse count value and computes a pulse width (a time interval) T between the previously sensed pulse edge and the currently sensed pulse edge and stores it one after another in the memory.

In the present embodiment, whenever the new pulse edge is sensed, the pulse width T is sequentially updated, so that the memory stores the latest four pulse widths T(0) to T(3). Specifically, whenever the pulse edge is sensed, the pulse width T(0) is newly computed, the previously stored pulse widths T(0) to T(2) are shifted as the pulse widths T(1) to T(3) while the previously stored pulse width T(3) is deleted from the memory.

Then, the controller 31 computes the rotational speed $\omega 0$ from an inverse of a sum (a pulse period P) of the pulse widths T of the pulse edges (the number of the pulse edges is n), which are sensed temporally continuously. The rotational speed $\omega 0$ is proportional to the actual rotational speed.

In the present embodiment, the average rotational speed $\omega 0(0)$ is computed from the pulse widths T(0) to T(3) of the latest four pulse edges. Then, when the next pulse edge is sensed, the rotational speed $\omega 0(0)$ is updated based on the newly computed pulse widths T(0) to T(3). At this time, the previous rotational speed $\omega 0(0)$ is stored as the rotational speed $\omega 0(1)$. In this way, the controller 31 always stores the latest eight rotational speeds $\omega 0(0)$ to $\omega 0(7)$, which are renewed every time the new pulse edge is sensed, i.e., are renewed at every predetermined moving distance or at every predetermined rotational angle. When the rotational speed $\omega 0$ is computed based on the multiple pulse widths T, it is possible to substantially eliminate variations in the sensor Duty of the respective received pulse signal outputs, and thereby it is possible to compute the rotational speed from which the erroneous changes are substantially eliminated.

Next, the controller 31 computes the average rotational speed difference (rotational speed change rate) $\Delta\omega 0$ from the rotational speed $\omega 0$ at step S2. Specifically, the latest four rotational speeds $\omega 0(0)$ to $\omega 0(3)$ are named as current block data and are summed to obtain a sum of the current block data, and the older four rotational speed $\omega 0(4)$ to $\omega 0(7)$ are named as previous block data and are summed to obtain a sum of the previous block data. Then, the sum of the current block data is subtracted from the sum of the previous block data. Specifically, the rotational speed difference $\Delta\omega 0$ is computed by subtracting the sum of the rotational speeds $\omega 0(0)$ to $\omega 0(3)$ from the sum of the rotational speeds $\omega 0(4)$ to $\omega 0(7)$ and is updated every time the pulse edge is sensed, i.e., at every predetermined moving distance or at every predetermined rotational angle. Alternatively, the computed value (sum of the rotational speeds) may be divided by the number (four in the present embodiment) of the computed rotational speeds in each block data. When the rotational speed difference $\Delta\omega 0$ is computed based on the multiple rotational speeds $\omega 0$, it is possible to substantially eliminate a phase difference between the rotational speeds $\omega 0$.

This rotational speed difference $\Delta\omega 0$ is temporarily stored in the memory in relation to the pulse count value.

Then, while a predetermined position of the window glass 11 is used as a reference, the controller 31 adds (cumulates) the correction value at step S3. This correction value is obtained by subtracting the learning data $\Delta\omega$, which corresponds to the pulse count value at the time of obtaining the computed rotational speed difference $\Delta\omega 0$, from the computed rotational speed difference $\Delta\omega 0$.

Then, it is determined whether the above correction value exceeds the disturbance determination threshold value C on the positive side at step S4. In the present embodiment, it is possible to limit the erroneous detection of the pinching, which would be caused by the disturbance that is generated, for example, when the vehicle runs onto a shoulder or when the door is closed.

Figure 7:
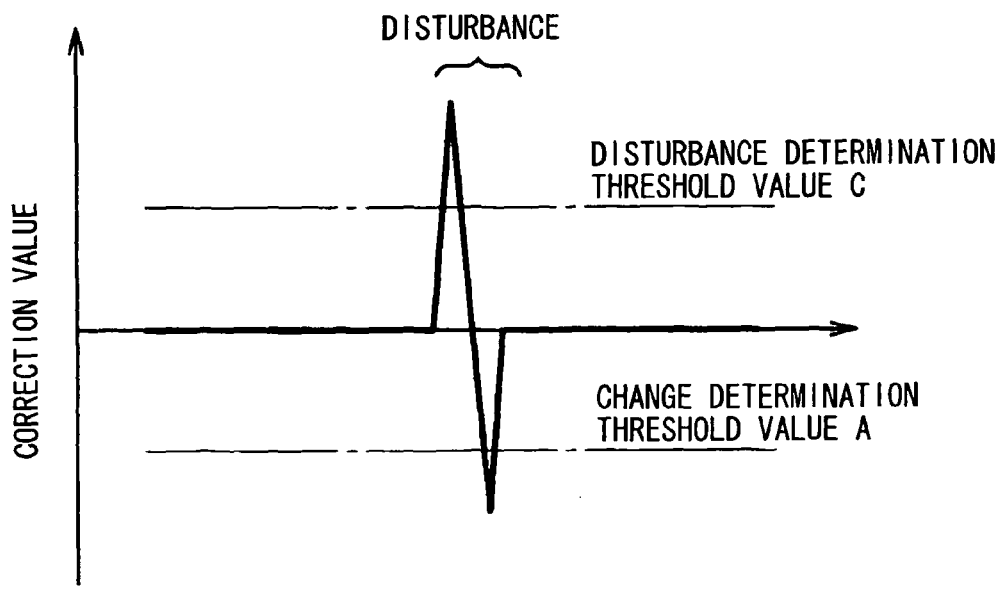
FIG. 7 is a diagram for describing the pinching determination operation at the time of application of the disturbance.

As shown in FIG. 7, when the disturbance is applied, the correction value, which is obtained by subtracting the learning data $\Delta\omega$ from the rotational speed difference $\Delta\omega 0$, normally becomes a positive or negative large value. When the correction value is shifted to the positive side, it indicates that the rotation of the motor 23 is accelerated in the closing direction of the window glass 11. In contrast, when the correction value is shifted to the negative side, it indicates that the rotation of the motor 23 is decelerated. The shift of the correction value to the negative side resembles occurrence of the pinching. Here, the disturbance determination threshold value C is a positive value. When the correction value exceeds the disturbance determination threshold value C on the positive side, the controller 31 determines that the disturbance has occurred.

When it is determined that the disturbance has occurred at step S4 (i.e., YES at step S4), the controller 31 increase a pinching determination threshold value B on the negative side at step S7. Thereafter, the controller 31 proceeds to step S8. In this way, even when the correction value is changed to the negative side thereafter to cause detection of the start of the pinching, the erroneous determination of the pinching can be limited since the cumulative value $\Sigma\Delta\omega 0$ of the rotational speed differences $\Delta\omega 0$ will never be increased beyond the pinching determination threshold value. In the present embodiment, the disturbance determination threshold value C is set regardless of a change determination threshold value A. Alternatively, for example, the disturbance determination threshold value C may be set to a value, which is obtained by reversing the sign (+/−) of the change determination threshold value A.

When it is determined that the disturbance has not occurred at step S4 (i.e., NO at step S4), the controller executes a pinching start determination operation at step S5. Specifically, the correction value is obtained by subtracting the learning data $\Delta\omega$ at the pulse count value, which corresponds to this rotational speed difference $\Delta\omega 0$, from this rotational speed difference $\Delta\omega 0$. Then, when this correction value exceeds the change determination threshold value A on the negative side, it is determined that the pinching has started. In contrast, when this correction value does not exceed the change determination threshold value A on the negative side, it is determined that the pinching has not started.

When it is determined that the pinching has started at step S5 (i.e., YES at step S5), the controller 31 proceeds to step S8. In contrast, when it is determined that the pinching has not started at step S5 (i.e., NO at step S5), the controller 31 proceeds to step S6. At step S6, the cumulative value of the correction values, each of which is obtained by subtracting the learning data $\Delta\omega$ from the rotational speed difference $\Delta\omega 0$, is initialized, and also the pinching determination threshold value B is initialized. Specifically, the cumulative value of the correction values, each of which is computed at step S3, is set to an initial change amount S of the rotational speed $\omega 0$, and the pinching determination threshold value B is returned to a normal value, which has not been increased at all. When it is determined that the period of disturbance is over, the pinching determination threshold value B is returned to the normal value, and the normal operation is performed.

Then, at step S8, a computing operation for computing the change amount S of the rotational speed $\omega 0$ is executed. Specifically, the controller 31 subtracts the cumulative value of the correction values computed at step S3 from the initial change amount S0 of the rotational speed $\omega 0$ (the cumulative value of the correction values) set at step S6 right before it is determined that the pinching has started. In this way, the change amount S of the rotational speed $\omega 0$ (the cumulative value of the correction values) since the start of the pinching is computed. Thereby, the change of the rotational speed caused by the pinching (i.e., the change caused by the pinching load) can be reliably computed.

In the present embodiment, the difference of the change amount relative to the reference value is computed to compute the change amount of the rotational speed $\omega 0$ since the start of the pinching. However, the present invention is not limited to this. For example, when the start of the pinching is not detected, the cumulative value of the correction values may be initialized. In contrast, when the start of the pinching is detected, the initialization of the cumulative value of the correction values may be prohibited. In this way, only the correction values, which are obtained since the detection of the start of the pinching, are cumulated, and the change amount of the rotational speed $\omega 0$ may be computed based on this cumulative value of the correction values.

Next, the controller 31 determines whether the change amount S of the rotational speed $\omega 0$, which is computed at step S8, has exceeded the pinching determination threshold value B at step S9.

When it is determined that the change amount S of the rotational speed $\omega 0$, which is computed at step S8, has exceeded the pinching determination threshold value B at step S9, the controller 31 proceeds to step S10. At step S10, the controller 31 executes a pinching releasing operation for releasing the pinched object from the window glass 11 and then terminates the operation. Specifically, in the pinching releasing operation, the controller 31 rotates the motor 23 in the reverse direction to lower the window glass 11 for a predetermined amount to release the pinched object from the window glass 11.

In contrast, when it is determined that the change amount S of the rotational speed $\omega 0$ has not exceeded the pinching determination threshold value B at step S9 (i.e., NO at step S9), the controller 31 terminates the operation.

Figure 8:
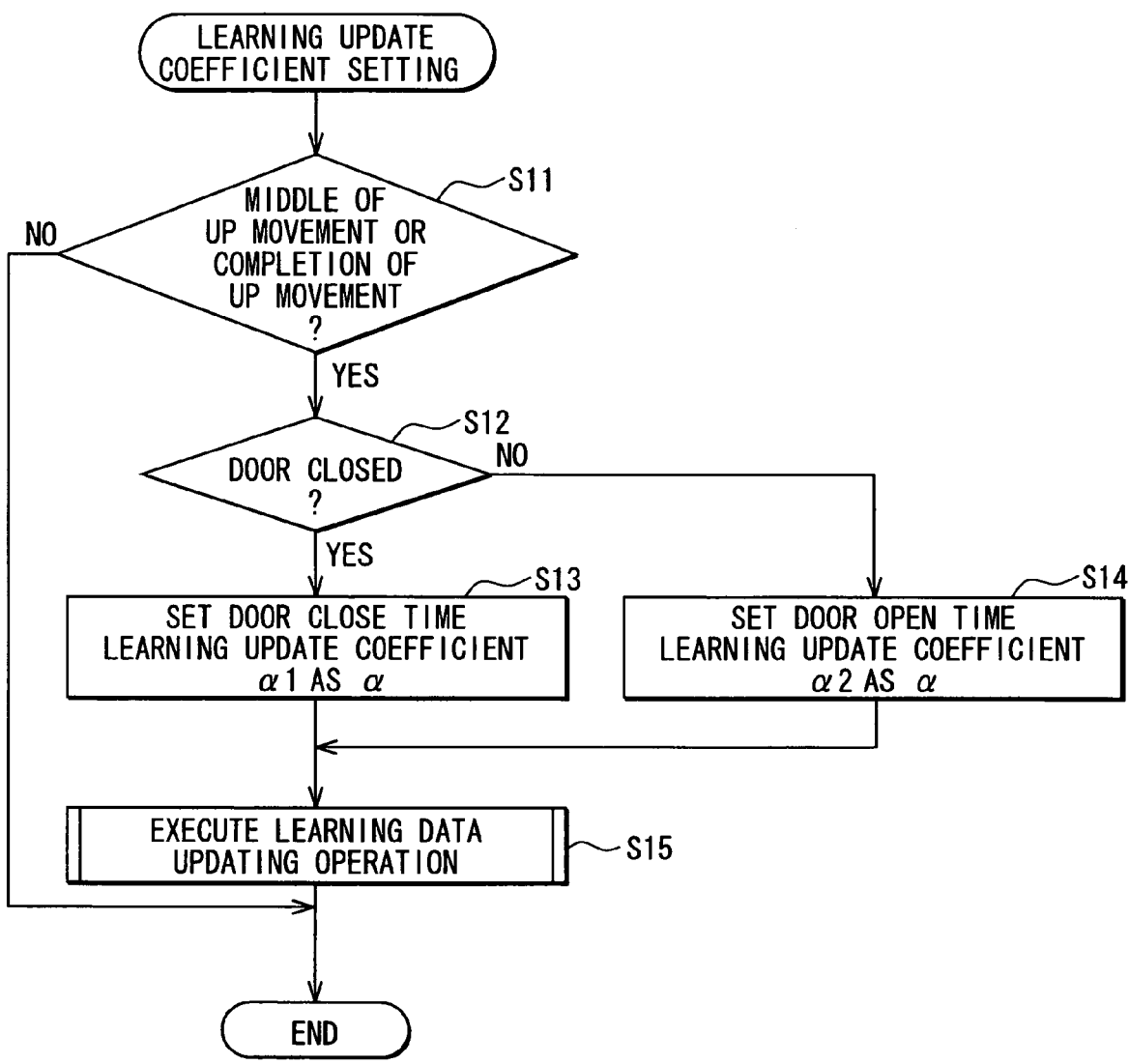
FIG. 8 is a diagram showing a flowchart of a learning update coefficient setting operation.

Next, a learning update coefficient setting operation of the controller 31 according to the present embodiment will be described with reference to FIG. 8. In this embodiment, this operation starts when the window glass 11 is placed in the full open state. Furthermore, this operation will be forcefully terminated when the pinching releasing operation is executed upon occurrence of the pinching.

At step S11, the controller 31 determines whether the window glass 11 is still in the middle of the closing movement (upward movement) or has completed the closing movement. When it is determined that the window glass 11 is not in the middle of the closing movement and has not completed the closing movement at step S11 (i.e., NO at step S11), the controller 31 terminates the operation. In contrast, when it is determined that the window glass 11 is still in the middle of the closing movement or has completed the closing movement at step S11 (i.e., YES at step S11), the controller 31 determines the open/close state of the door at step S12. The determination of the open/close state of the door is made based on the open/close signal supplied from the door open/close sensing device 7 to the controller 31.

When it is determined that the door is in the close state at step S12 (i.e., YES at step S12), the controller 31 proceeds to step S13. At step S13, the controller 31 sets the door close time learning update coefficient $\alpha 1$ ($0<\alpha 1<1$) as the learning update coefficient $\alpha$. In contrast, when it is determined that the door is not in the close state, i.e., is in the open state at step S12 (i.e., NO at step S12), the controller 31 proceeds to step S14. At step S14, the controller 31 sets the door open time learning update coefficient $\alpha 2$ ($0<\alpha 2<1$) as the learning update coefficient $\alpha$. The above coefficients $\alpha 1$, $\alpha 2$ are predetermined constants, which are prestored in the memory and have the relationship of $\alpha 1<\alpha 2$. At step S13 or step S14, the corresponding coefficient $\alpha 1$, $\alpha 2$ is retrieved from the memory and is stored in the memory as the learning update coefficient $\alpha$.

Thereafter, the learning data updating operation is executed at step S15.

Figure 9:
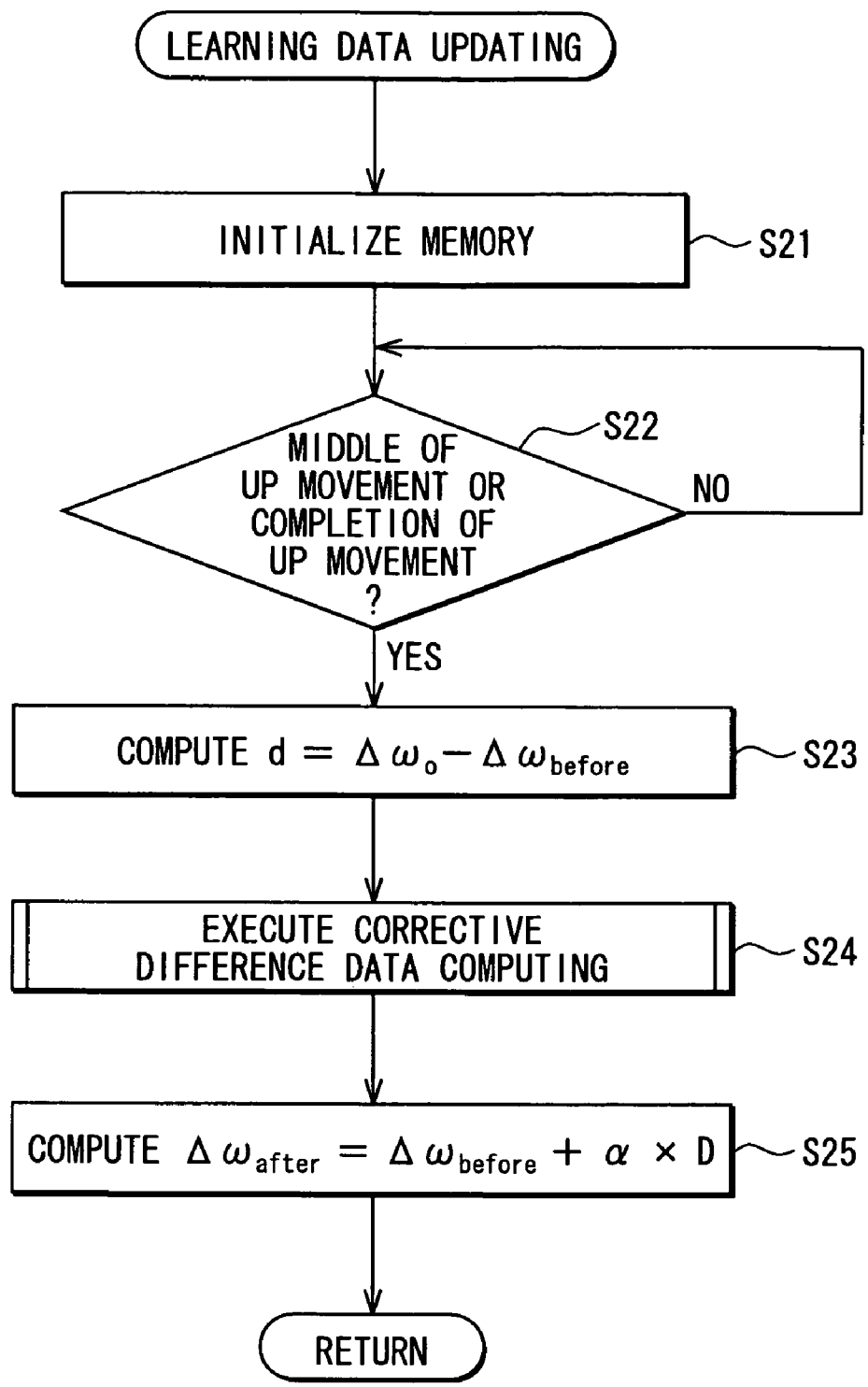
FIG. 9 is a diagram showing a flowchart of a learning data updating operation.

Next, the learning data updating operation of the controller 31 according to the present embodiment will be described with reference to FIG. 9. The controller 31 initializes the memory at step S21 to update the learning data $\Delta\omega$ and then stands by. Then, at step S22, it is determined whether the window glass 11 is in the middle of the closing movement or has completed the closing movement from the full open position to the full close position. The controller 31 determines whether the window glass 11 is in the middle of the closing movement or has completed the closing movement to the full close position based on the pulse signal. When it is determined that the window glass 11 is not in the middle of the closing movement and has not completed the closing movement to the full close position at step S22 (i.e., NO at step S22), the controller 31 repeats step S22. In contrast, when it is determined that the window glass 11 is in the middle of the closing movement or has completed the closing movement to the full close position at step S22 (i.e., YES at step S22), the controller 31 proceeds to step S23.

When the window glass 11 is moved to the full close position, at step S23, the controller 31 computes the difference data d for each pulse count value by subtracting the corresponding learning data $\Delta\omega$ from each corresponding one of the stored rotational speed differences $\Delta\omega 0$, which are stored in relation to the pulse count values, respectively, for every predetermined moving amount (or for every predetermined rotational angle).

Then, at step S24, the controller 31 executes a computation operation for computing the corrective difference data D based on the value of the difference data d.

Figure 10:
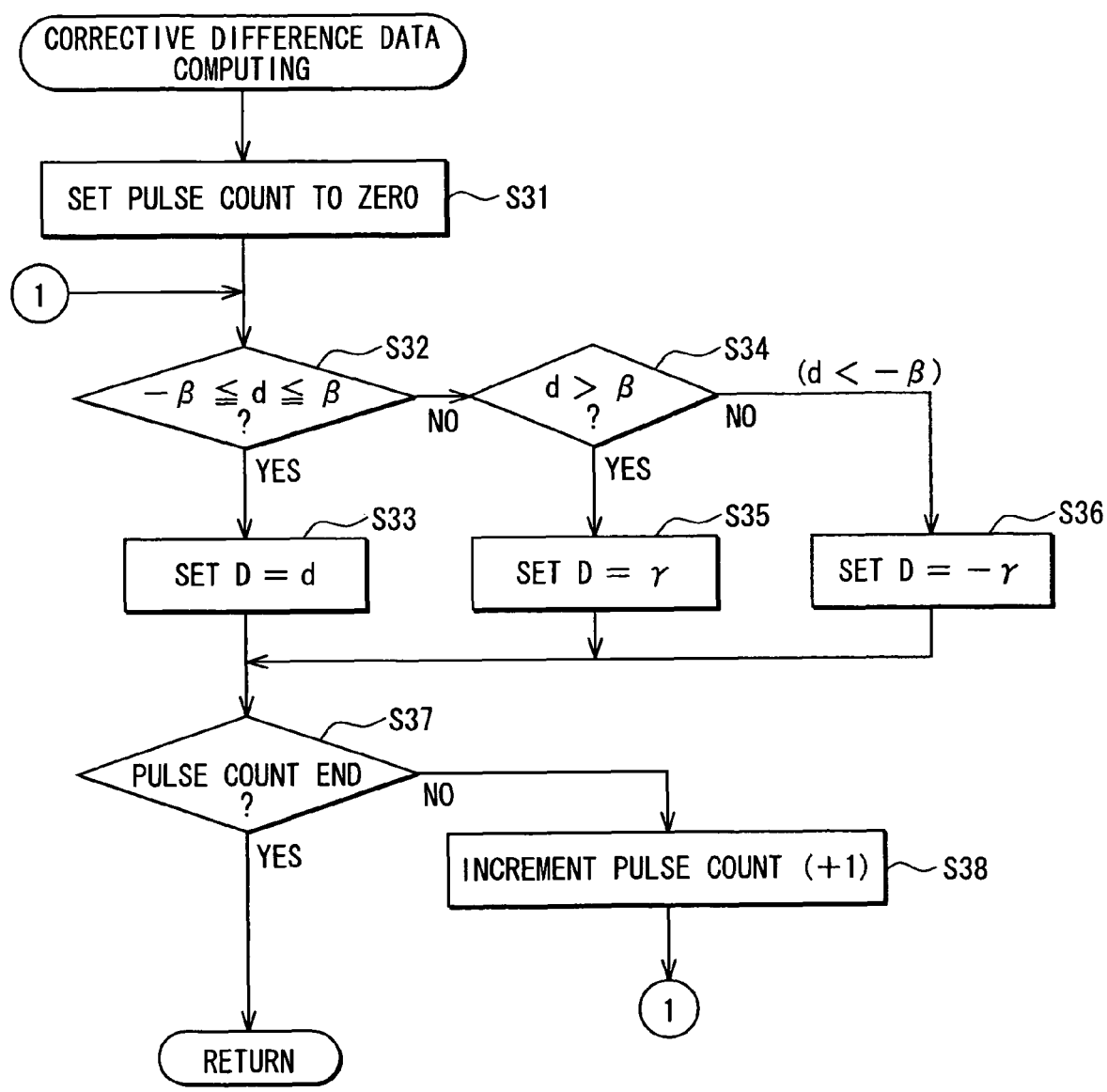
FIG. 10 is a diagram showing a flowchart of a corrective difference data computing operation.

FIG. 10 shows a flow of the computation operation for computing the corrective difference data D. In this operation, the controller 31 sets the pulse count to zero (0). Then, at step S32, it is determined whether the difference data d, which corresponds to this pulse count, is in the range (the normal learning data update range) from the disturbance learning data determination threshold value $-\beta$ to the disturbance learning data determination threshold value $\beta$ (i.e., $-\beta \leq d \leq \beta$).

When it is determined that the difference data d is in the range from the disturbance learning data determination threshold value $-\beta$ to the disturbance learning data determination threshold value $\beta$ at step S32 (i.e., YES at step S32), the controller 31 proceeds to step S33. At step S33, the controller 31 sets the difference data d as the corrective difference data D and proceeds to step S37.

When it is determined that the difference data d is not in the range from the disturbance learning data determination threshold value $-\beta$ to the disturbance learning data determination threshold value $\beta$ at step S32 (i.e., NO at step S32), the controller 31 proceeds to step S34.

At step S34, it is determined whether the difference data d exceeds the disturbance learning data determination threshold value $\beta$. When it is determined that the difference data d exceeds the disturbance learning data determination threshold value $\beta$ at step S34 (i.e., YES at step S34), the controller 31 proceeds to step S35. At step S35, the controller 31 sets the predetermined disturbance learning data update amount y as the corrective difference data D and then proceeds to step S37.

In contrast, when it is determined that the difference data d does not exceed the disturbance learning data determination threshold value $\beta$ at step S34 (i.e., NO at step S34, i.e., $d < -\beta$), the controller 31 proceeds to step S36. At step S36, the controller 31 sets the predetermined disturbance learning data update amount $-\gamma$ as the corrective difference data D and then proceeds to step S37.

At step S37, it is determined whether the pulse count value corresponds to the full close position. When it is determined that the pulse count value corresponds to the full close position at step S37 (i.e., YES at step S37), the controller 31 terminates the operation. In contrast, when it is determined that the pulse count value does not correspond to the full close position at step S37 (i.e., NO at step S37), the controller 31 proceeds to step S38. At step S38, the controller 31 increments the pulse count value and returns to step S32 to repeat steps S32 to S37.

In this way, the corrective difference data D is set for each pulse count value.

When the corrective difference data D is set, the controller 31 executes an updating operation for updating the learning data $\Delta\omega$ at step S25. In this operation, for each pulse count value, the product of the corrective difference data D and the learning update coefficient $\alpha$ ($0<\alpha<1$) is added to the current pre-update learning data $\Delta\omega$ before.

Here, the door close time learning update coefficient $\alpha 1$ set at step S13 or the door open time learning update coefficient $\alpha 2$ set at step S14 is set as the learning update coefficient $\alpha$ depending on the open/close state of the door.

As described above, in the power window system 1 of the present embodiment, the different update coefficients are used in the door open time and the door close time, respectively, to update the learning data. Thus, even in the case of the sashless door where the slide resistance differs between the door open time and the door close time, the updating of the learning data can be appropriately executed, so that it is possible to reduce the erroneous detection of the pinching. Furthermore, even at the weather strip where the change of the motor rotational speed differs significantly between the door open time (door open state) and the door close time (door close state), the erroneous detection of the pinching can be limited. Thus, the insensitive range (the range where the detection of the pinching is not carried out) can be made narrower in comparison to the prior art case. Furthermore, in the case where the disturbance is applied, the difference data, which is obtained by subtracting the learning data from the rotational speed difference, is corrected to the appropriate value to compute and update the learning data. In this way, it is possible to limit occurrence of the erroneous detection of the pinching caused by the influences of the disturbance.

Figure 11:
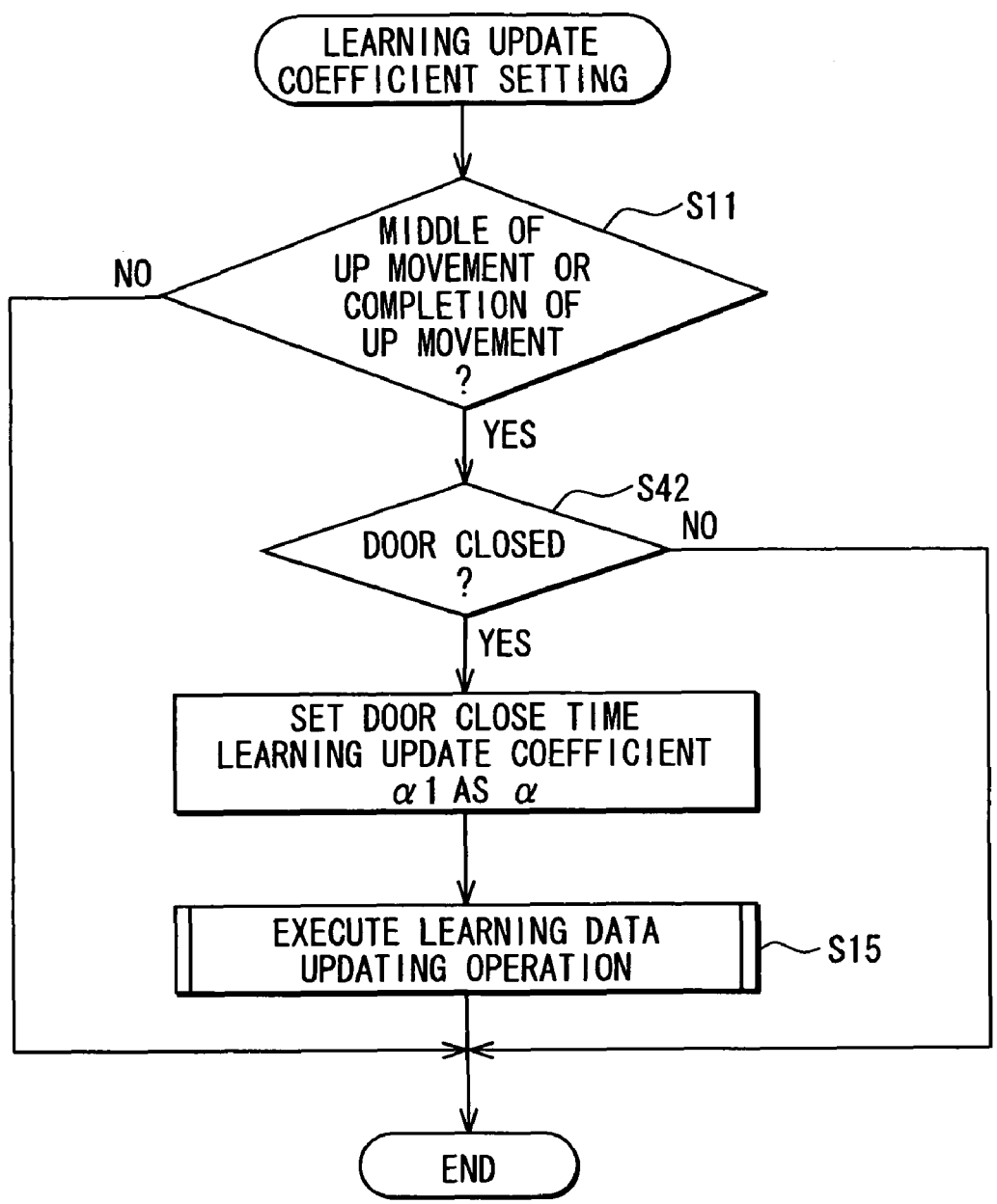
FIG. 11 is a diagram showing a flowchart of a learning update coefficient setting operation according to a first modification of the embodiment.

In the above embodiment, the door close time learning update coefficient $\alpha 1$ is used as the learning update coefficient $\alpha$ at the door close time, and the door open time learning update coefficient $\alpha 2$ is used as the learning update coefficient $\alpha$ at the door open time. Thereby, the two different coefficients $\alpha 1$, $\alpha 2$ (having the relationship of $\alpha 1 < \alpha 2$) are used depending on the open/close state of the door. Alternatively, at the door open time where the slide resistance is relatively small, the updating of the learning update coefficient may be not executed. FIG. 11 shows a flow of the learning update coefficient setting operation used in such a case. Steps, which are similar to those of the above embodiment, will be indicated by the same reference numerals and will not be described further for the sake of simplicity. At step S42 of FIG. 11, it is determined whether the door is in the close state. When it is determined that the door is in the close state at step S42 (i.e., YES at step S42), the controller 31 proceeds to step S13. At step S13, the controller 31 sets the door close time learning update coefficient $\alpha 1$ ($0<\alpha 1<1$) as the learning update coefficient $\alpha$. In contrast, when it is determined that door is not in the close state, i.e., is in the open state at step S42 (i.e., NO at step S42), the controller 31 terminates the operation. Even with the above modification, advantages similar to those of the power window system 1 of the above embodiment can be achieved.

Furthermore, in the above embodiment, the conversion from the difference data d to the corrective difference data D is performed in the manner discussed with reference to FIG. 3. However, the present invention is not limited to this. Specifically, in the case of FIG. 3, when the difference data d exceeds the disturbance learning data determination threshold value ($-\beta$, $\beta$), the constant disturbance learning data update amount is set as the corrective difference data D.

Figure 12A:
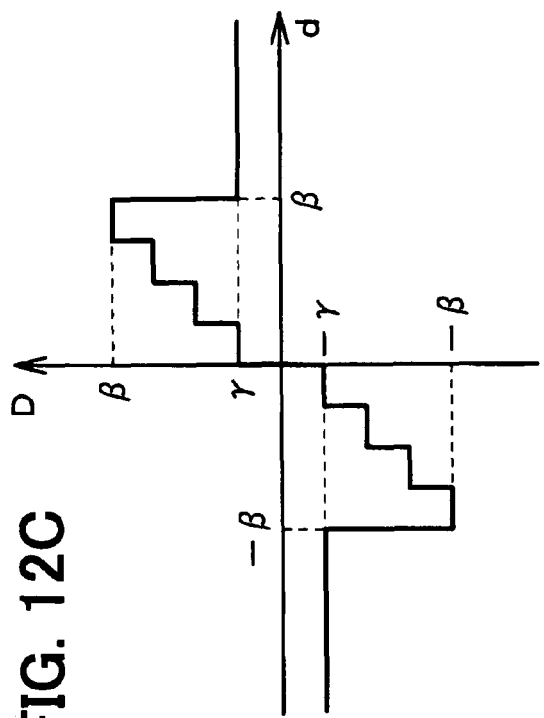
FIGS. 12A to 12D are diagrams showing various methods for converting the difference data to corrective difference data according to a second modification of the embodiment.
Figure 12C:
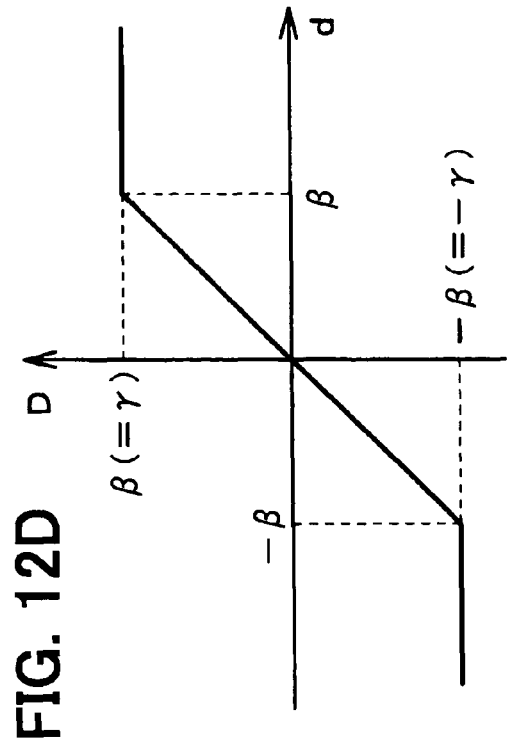
Figure 12B:
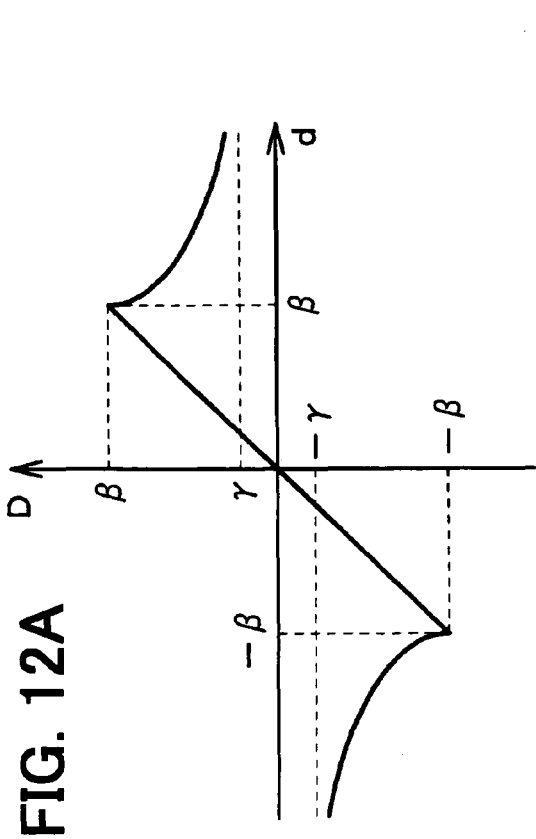

Alternatively, as shown in FIGS. 12A and 12B, when the difference data d exceeds the disturbance learning data determination threshold value ($-\beta$, $\beta$), the values of the corrective difference data D may be set to continuously change before and after the disturbance learning data determination threshold value ($-\beta$, $\beta$). In FIG. 12A, when the difference data d exceeds the disturbance learning data determination threshold value (−β, β), the corrective difference data D may be set to approach the disturbance learning data update amount (−γ, γ) in an exponential manner or a high-dimensional functional manner. In FIG. 12B, when the difference data d exceeds the disturbance learning data determination threshold value (−β, β), the corrective difference data D may be set to gradually approach the disturbance learning data update amount (−γ, γ) and become the disturbance learning data update amount (−γ, γ) at or beyond a predetermined value.

Furthermore, as shown in FIG. 12C, the corrective difference data D may be set to change in a stepwise manner depending on the degree of the difference data d in the range of the disturbance learning data determination threshold values (−β, β), i.e., in the normal learning data update range.

Figure 12D:
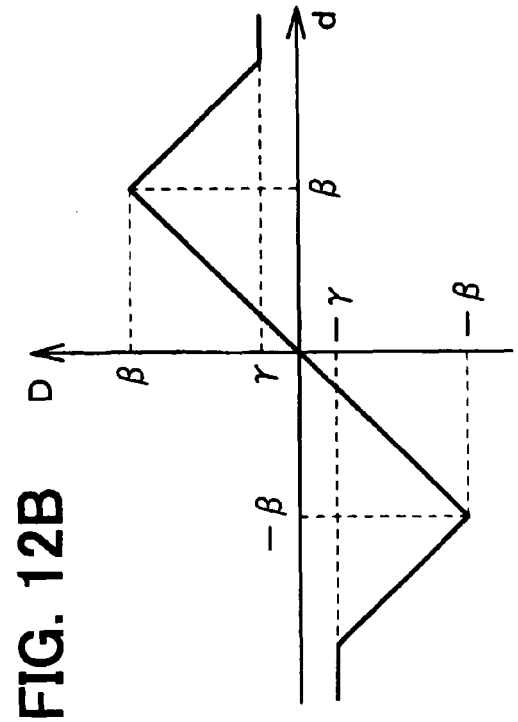
Figure 13:
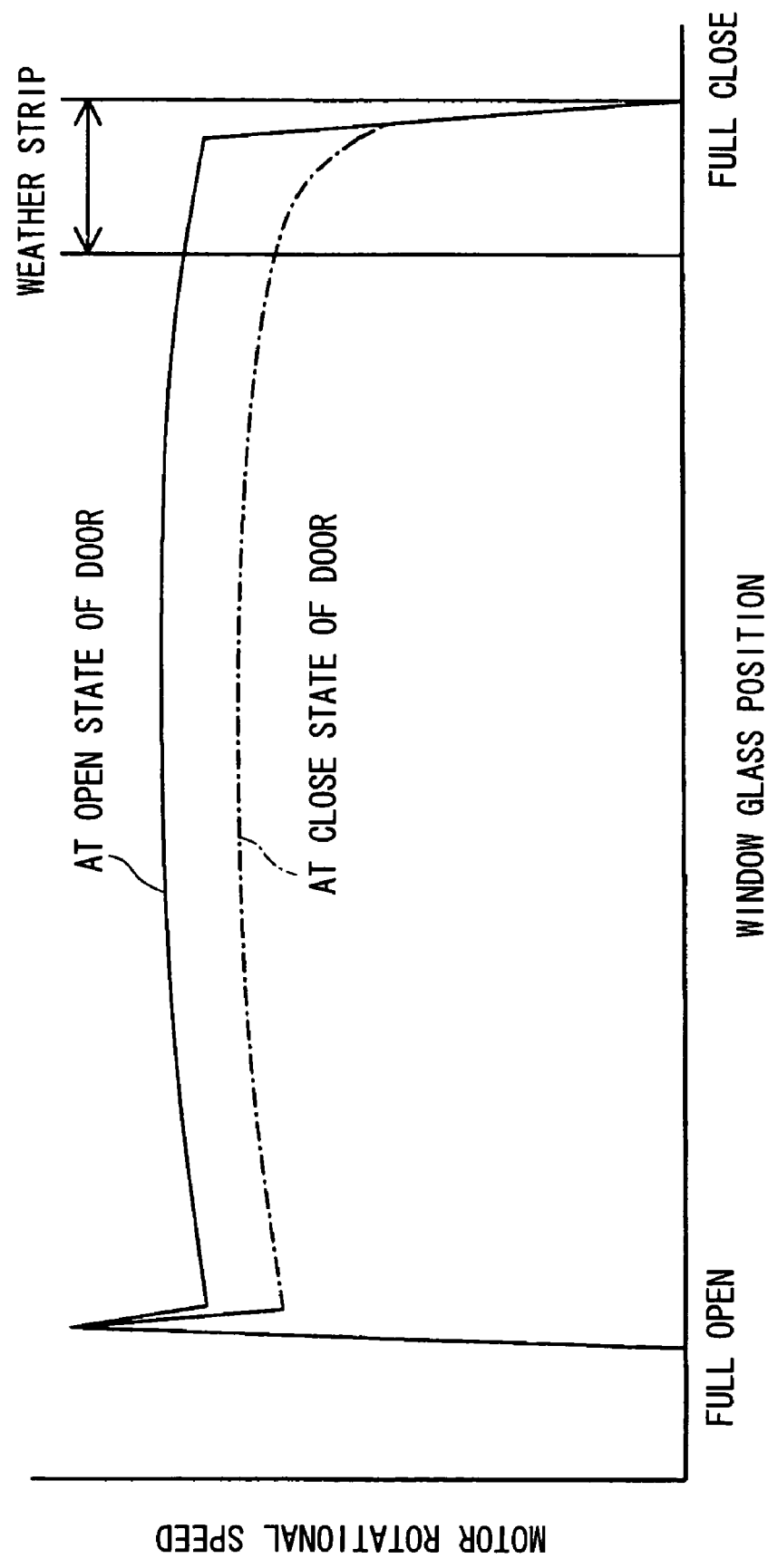
FIG. 13 is a diagram sowing a relationship between a motor rotational speed and a window glass position in the open state of the door and in the close state of the door.

Furthermore, as shown in FIG. 12D, the values of the disturbance learning data update amount (−γ, γ) may be set to the same values as those of the disturbance learning data determination threshold value (−β, β). Specifically, when the difference data d exceeds the disturbance learning data determination threshold value (−β, β), the corrective difference data D is fixed to the disturbance learning data determination threshold value (−β, β). In this way, in the case where the difference data d exceeds the disturbance learning data determination threshold value (−β, β), it is not required to separately set the disturbance learning data update amount (−γ, γ). Thus, the data processing can be simplified. Furthermore, any combination of FIGS. 12A to 12B can be used.

Furthermore, in the above embodiment, the closure panel control apparatus of the present invention is applied to the power window system 1 of the vehicle. Alternatively, the closure panel control apparatus of the present invention may be implemented to open/close a closure panel in any other system, such as a sunroof open/close system, a slide door open/close system.

Furthermore, in the above embodiment, values of the learning data Δω form the data column, in which the values correspond to all the pulse count values, respectively. Alternatively, the values of the learning data Δω may form a data column, in which values are stored for every n pulse count value (e.g., the value of n being equal to or higher than 2). In this way, the required memory storage space in the controller 31 can be reduced in comparison to the case where the values of the learning data Δω are stored for every count value. In such a case, an average value (a mean value) of the values obtained through every n pulse count may be stored as the learning data Δω. Then, at the time of performing the pinching determination operation, the learning data Δω of the subject count value may be retrieved from the memory. Furthermore, if there is no learning data Δω of the subject pulse count value stored in the memory, the learning data Δω before the subject count value and the learning data Δω after the subject count value may be retrieved from the memory, and the learning data Δω of the subject count value may be obtained from the learning data Δω before the subject count value and the learning data Δω after the subject count value through proportional allocation.

Additional advantages and modifications will readily occur to those skilled in the art. The invention in its broader terms is therefore not limited to the specific details, representative apparatus, and illustrative examples shown and described.

What is claimed is:

1. A closure panel control apparatus for a vehicle, comprising:
a drive means for driving a closure panel, which is provided at a door of the vehicle, to open and close the closure panel;
a moving speed sensing means for outputting a speed measurement signal in response to an opening movement and a closing movement of the closure panel;
a moving speed storage means for prestoring average moving speed data, which corresponds to respective corresponding positions of the closure panel at the time of the closing movement of the closure panel, as learning data;
a pinching sensing means for sensing pinching of an object by the closure panel based on:
the learning data; and
the speed measurement signal, which is received from the moving speed sensing means at the time of the closing movement of the closure panel;
a disturbance sensing means for sensing a disturbance when the speed measurement signal, which is obtained at the time of the closing movement of the closure panel, exceeds a predetermined value; and
a moving speed updating means for updating the learning data based on the average moving speed data computed based on the speed measurement signal obtained at the time of the closing movement of the closure panel, wherein:
the moving speed updating means controls execution and non-execution of updating of the learning data in response to a close state and an open state of the door, wherein the moving speed updating means computes the learning data through use of different update coefficients that are specified for the open state and the close state, respectively, of the door; and
the moving speed updating means computes and updates the learning data through use of a disturbance update value, which is corrected to fall within a predetermined range, when the disturbance is sensed with the disturbance sensing means.

2. The closure panel control apparatus according to claim 1, wherein the update coefficient specified for the open state of the door is larger than the update coefficient specified for the close state of the door.

3. The closure panel control apparatus according to claim 1, wherein the disturbance update value is variable in response to the speed measurement signal.

4. The closure panel control apparatus according to claim 1, wherein:
the drive means includes an electric motor;
the moving speed sensing means outputs a rotational speed signal of the motor as the speed measurement signal; and
the average moving speed data is average rotational speed data of the motor, which is computed based on the rotational speed signal.

5. A closure panel control apparatus for a vehicle, comprising:
a drive means for driving a closure panel, which is provided at a door of the vehicle, to open and close the closure panel;
a moving speed sensing means for outputting a speed measurement signal in response to an opening movement and a closing movement of the closure panel;
a moving speed storage means for prestoring average moving speed data, which corresponds to respective corresponding positions of the closure panel at the time of the closing movement of the closure panel, as learning data;
a pinching sensing means for sensing pinching of an object by the closure panel based on:
the learning data; and
the speed measurement signal, which is received from the moving speed sensing means at the time of the closing movement of the closure panel; and a moving speed updating means for updating the learning data based on the average moving speed data computed based on the speed measurement signal obtained at the time of the closing movement of the closure panel, wherein:

the moving speed updating means controls execution and non-execution of updating of the learning data in response to a close state and an open state of the door; and the moving speed updating means does not execute the updating of the learning data when the door is in the open state.

6. The closure panel control apparatus according to claim 5, wherein:

the drive means includes an electric motor;

the moving speed sensing means outputs a rotational speed signal of the motor as the speed measurement signal; and the average moving speed data is average rotational speed data of the motor, which is computed based on the rotational speed signal.

* * * * *